(12) United States Patent
Iacaruso et al.

(10) Patent No.: US 12,421,055 B2
(45) Date of Patent: Sep. 23, 2025

(54) EQUIPMENT FOR THE LOGISTICS OF SLAB-SHAPED ARTICLES

(71) Applicant: LK LAB S.R.L., Fiorano Modenese (IT)

(72) Inventors: Luca Iacaruso, Fiorano Modenese (IT); Michele Iacaruso, Fiorano Modenese (IT)

(73) Assignee: LK LAB S.R.L., Fiorano Modenese (IT)

( * ) Notice: Subject to any disclaimer, the term of this patent is extended or adjusted under 35 U.S.C. 154(b) by 418 days.

(21) Appl. No.: 17/786,090

(22) PCT Filed: Dec. 16, 2020

(86) PCT No.: PCT/IB2020/062022
§ 371 (c)(1),
(2) Date: Jun. 16, 2022

(87) PCT Pub. No.: WO2021/124145
PCT Pub. Date: Jun. 24, 2021

(65) Prior Publication Data
US 2023/0050724 A1    Feb. 16, 2023

(30) Foreign Application Priority Data
Dec. 17, 2019 (IT) .................. 102019000024337

(51) Int. Cl.
*B65G 49/06* (2006.01)
*B65G 1/137* (2006.01)
*B65G 61/00* (2006.01)

(52) U.S. Cl.
CPC ......... *B65G 49/067* (2013.01); *B65G 1/1375* (2013.01); *B65G 49/062* (2013.01);
(Continued)

(58) Field of Classification Search
CPC ....... B25J 5/02; B25J 9/0093; G05B 19/4182; B65G 47/914; B65G 47/918; B65G 2201/022
See application file for complete search history.

(56) References Cited

U.S. PATENT DOCUMENTS 6,059,092 A *  5/2000  Jerue .................. B65G 1/1373
                                                          198/364
12,195,288 B2 *  1/2025  Iacaruso ............. B65G 47/914
(Continued)

FOREIGN PATENT DOCUMENTS

DE    20 2013 103555 U1    11/2014
EP       0 302 205 A2       2/1989
(Continued)

*Primary Examiner* — Gerald McClain
(74) *Attorney, Agent, or Firm* — ASLAN LAW, P.C.

(57) ABSTRACT

Equipment for the logistics of slab-shaped articles comprising one supplying plane of at least one slab-shaped article, one robotic gripping group of the slab-shaped article, a (tangible) movement component/unit/device/machine (or the like) of the gripping group along one direction of movement, a plurality of temporary storage stations of the slab-shaped article, one supporting frame of the slab-shaped article supported as an integral part to the movement component/unit/device/machine, and one unloading station of the supporting frame, wherein the gripping group is adapted to: take the slab-shaped article from the supplying plane, place the slab-shaped article on one of the storage stations, and take the slab-shaped article from one of the storage stations to place it on the supporting frame.

27 Claims, 12 Drawing Sheets

(52) U.S. Cl.
CPC .......... *B65G 49/068* (2013.01); *B65G 61/00* (2013.01); *B65G 2249/04* (2013.01)

(56) References Cited

U.S. PATENT DOCUMENTS

2006/0133917 A1    6/2006   Clark et al.
2008/0267759 A1   10/2008   Morency et al.

FOREIGN PATENT DOCUMENTS

| EP | 302205 A | * | 2/1989 | ................ B66F 9/06 |
| FR | 2 286 767 A1 | | 4/1976 | |
| JP | H04 371395 A | | 12/1992 | |
| WO | WO-2018229591 A1 | * | 12/2018 | .......... B25J 15/0052 |

* cited by examiner

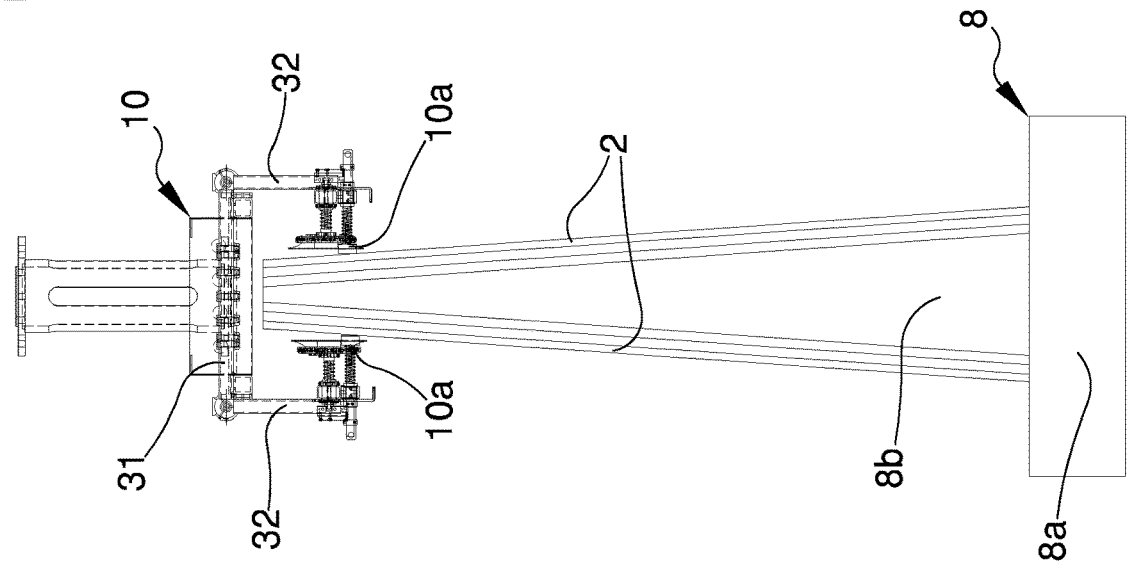
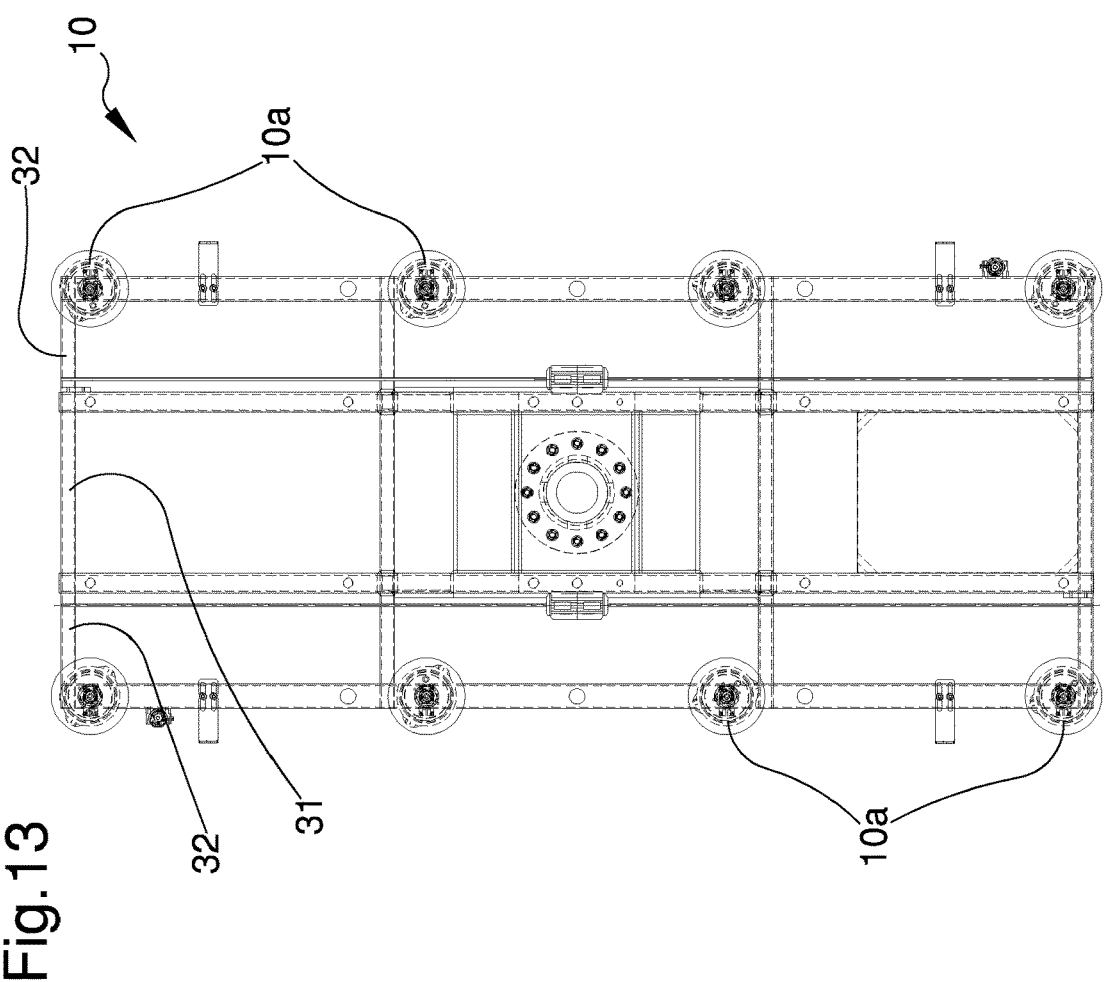

EQUIPMENT FOR THE LOGISTICS OF SLAB-SHAPED ARTICLES

CROSS-REFERENCE TO RELATED APPLICATIONS

This application claims priority to IT Patent Application No. 102019000024337 filed on Dec. 17, 2019, and this application claims priority to and is a 371 of international PCT Application No. PCT/IB2020/062022 filed on Dec. 16, 2020, the entire contents of which are hereby incorporated by reference.

TECHNICAL FIELD

The present invention relates to a piece of equipment for the logistics of slab-shaped articles.

BACKGROUND ART

The term "logistics" relates to the entirety of the movement and storage operations of slab-shaped articles.

More specifically, a slab-shaped article is a product obtained as a result of an industrial process and, specifically, a large slab.

At the end of the production process, the slab-shaped articles are generally moved in such a way as to send them to subsequent stations where further machining phases are carried out, such as grinding, or to storage areas, while waiting for packaging for marketing.

During the storage phase, the slab-shaped articles are placed on appropriate frames, which can be of the horizontal or vertical type depending on the position taken by the slab-shaped articles themselves, and are then moved individually or in block together with the relevant frame.

The movement of the slab-shaped articles is generally carried out by means of appropriate equipment, such as e.g. suction cups, which can be operated manually or automatically.

Given the dimensions, often very large, of the slab-shaped articles, it is easy to understand that their movement is particularly fragile, so the further away the storage areas are, the greater the risk of breakage during the travel to reach them.

In order to avoid this drawback, the slab-shaped articles are often moved together with their frame.

However, this type of movement also has a high risk of breakage.

In fact, in the case of horizontal frames, the weight of the slab-shaped articles placed one on top of the other affects the slab-shaped article placed lower down, which, as a result of this mechanical stress, may be broken or deformed. The presence of any flakes of material determines a non-linear and uniform distribution of the load that can cause the unbalancing of the relevant stack and the fall of the slab-shaped articles that compose it, especially during movement operations.

In the case of vertical frames, on the other hand, the slab-shaped articles are often unstable, so that the displacement of the frame itself can cause the articles themselves to tip over or fall.

It follows, therefore, that the movement of the slab-shaped articles is now particularly fragile and, in addition to involving a high risk of breakage of the articles themselves, requires a considerable expenditure of time that reduces, consequently, the performance of the production line.

The storage methods of the slab-shaped articles used today, in which the storage areas are often far from the production line, and the frames described above also require large working spaces.

DESCRIPTION OF THE INVENTION

The main aim of the present invention is to devise a piece of equipment for the logistics of slab-shaped articles that allows the slab-shaped articles to be moved easily and safely in order to limit the risk of breakage or damage to the slab-shaped articles themselves.

Within this aim, one object of the present invention is to speed up the movement of the slab-shaped articles in order to increase the production output of the relevant plant.

Another object of the present invention is to devise a piece of equipment for the logistics of slab-shaped articles that allows reducing the working areas and space required to perform the movement and storage operations.

Another object of the present invention is to devise a piece of equipment for the logistics of slab-shaped articles that allows overcoming the aforementioned drawbacks of the prior art within a simple, rational, easy, effective to use and low cost solution.

The objects set out above are achieved by the present piece of equipment for the logistics of slab-shaped articles having the characteristics of claim 1.

BRIEF DESCRIPTION OF THE DRAWINGS

Other characteristics and advantages of the present invention will become more evident from the description of some preferred, but not exclusive, embodiments of a piece of equipment for the logistics of slab-shaped articles, illustrated by way of an indicative, yet non-limiting example, in the accompanying tables of drawings wherein:

FIG. 13 is a plan view of the grasping means according to the invention;

FIG. 14 is a side view of the grasping means according to the invention, in a blocking position.

EMBODIMENTS OF THE INVENTION

Figure 1:
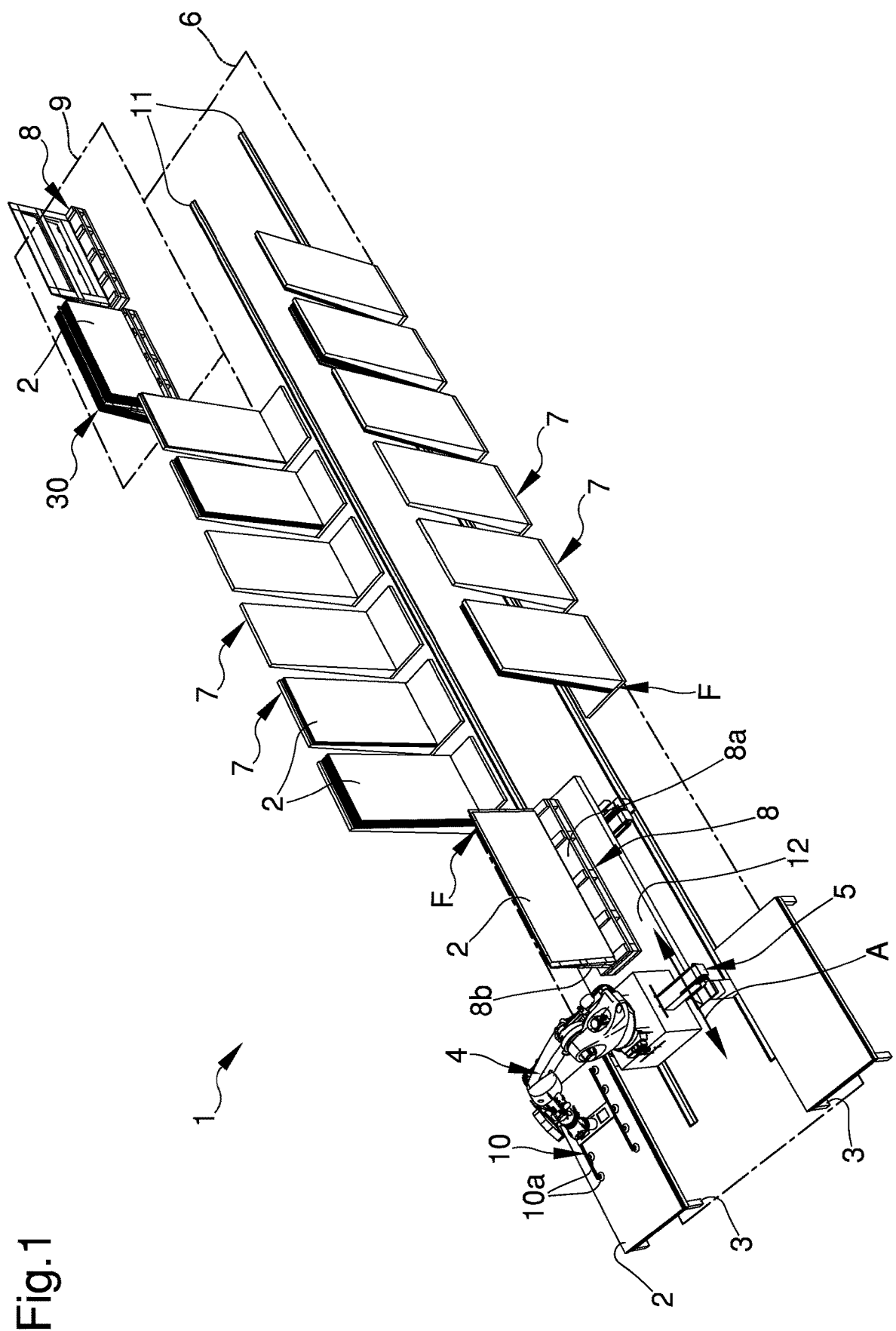
FIGS. 1-4 are perspective views of a first embodiment of the equipment according to the invention, in different operational phases.
Figure 2:
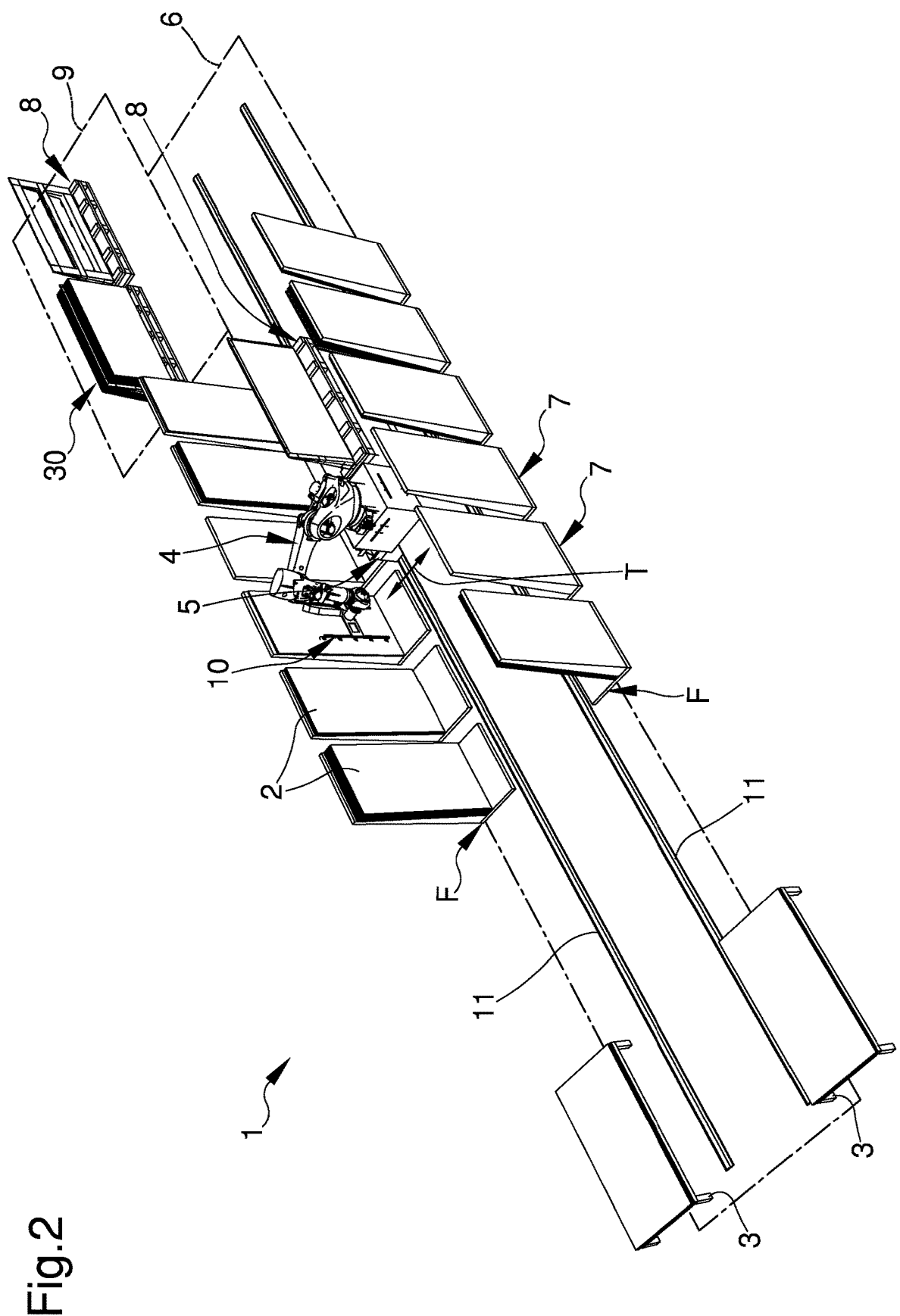
Figure 3:
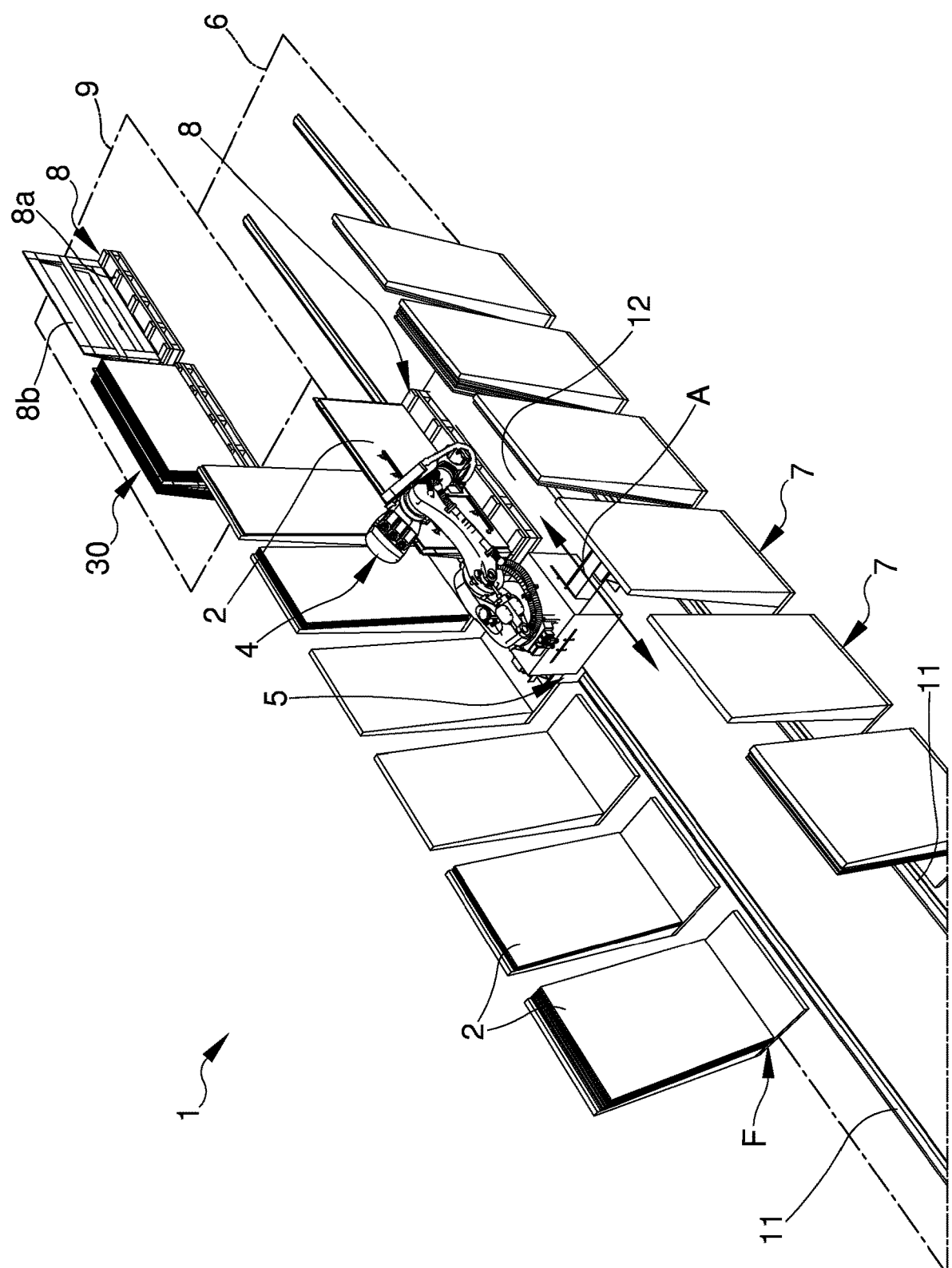
Figure 4:
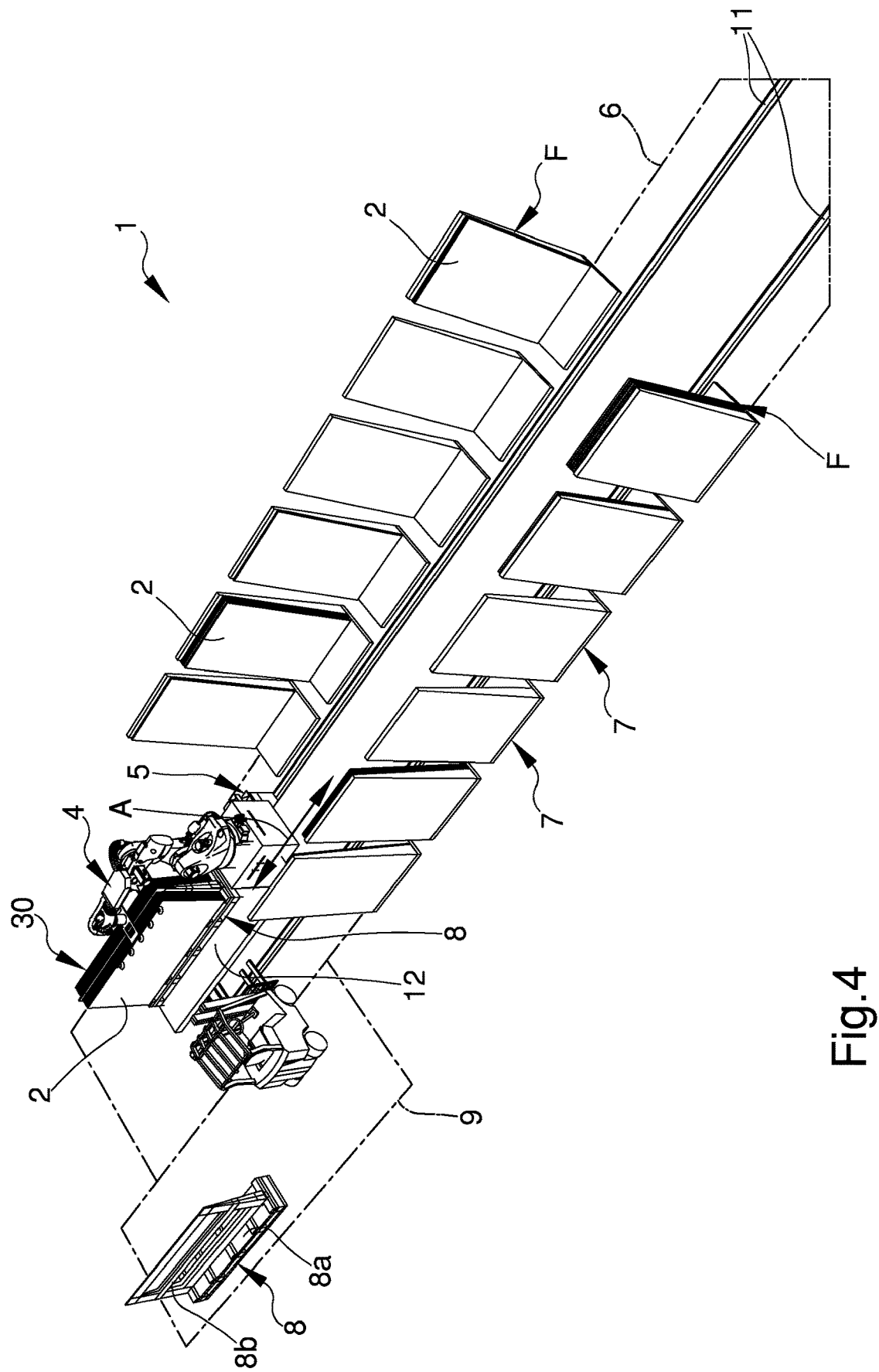

With particular reference to these figures, reference numeral 1 globally indicates a piece of equipment for the logistics of slab-shaped articles.

In the context of the present discussion, the term "logistics" relates to the set of maintenance and storage operations of slab-shaped articles aimed at preparing the same for shipment to customers.

The piece of equipment 1 is used to move at least one slab-shaped article 2.

The slab-shaped article 2 is a solid body having two dimensions prevailing over the third, thickness, and comprising two substantially flat faces opposite each other.

For example, within the ceramic industry, the slab-shaped articles 2 may have dimensions such that one or more sides may be up to and comprising over three meters long.

The equipment 1 comprises at least one supplying plane 3 of at least one slab-shaped article 2.

The supplying plane 3 is shaped to receive in support a plurality of slab-shaped articles 2 arranged one on top of the other.

In particular, the supplying plane 3 is adapted to receive the slab-shaped articles 2 by means of appropriate lifting machines, such as e.g., forklift trucks or transpallets or mechanical robots or manually by an operator.

In addition, the equipment 1 may conveniently further comprise at least one container body 29 positionable on the supplying plane 3 and adapted to contain a plurality of slab-shaped articles 2.

In more detail, the container body 29 is adapted to house the slab-shaped articles 2 stacked one on top of the other.

The function of the container body 29 is to facilitate the transport and positioning of the slab-shaped articles 2 on the supplying plane 3.

In the embodiment shown in the figures, the container body 29 is open at the top and allows the slab-shaped article 2 to be taken from the top.

According to the invention, the equipment 1 also comprises:
- at least one robotic gripping group 4 of the slab-shaped article 2 provided with at least three degrees of freedom and positioned in the proximity of the supplying plane 3;
- movement means 5 of the gripping group 4 along at least one direction of movement A so as to define at least one work area 6 of the gripping group 4;
- a plurality of temporary storage stations 7 of the slab-shaped article 2 positioned substantially parallel to the direction of movement A;
- at least one supporting frame 8 of the slab-shaped article 2 supported as an integral part to the movement means 5 along the direction of movement A; and
- at least one unloading station 9 of the supporting frame 8.

The gripping group 4 is adapted to:
- take the slab-shaped article 2 from the supplying plane 3;
- place the slab-shaped article 2 on at least one of the storage stations 7; and
- take the slab-shaped article 2 from at least one storage station 7 to place it on the supporting frame 8.

In particular, thanks to the movement means 5, the gripping group 4 can be approached to the supplying plane 3 and, moreover, being provided with three degrees of freedom, it can be moved along a substantially vertical direction and be rotated to allow the picking up of the slab-shaped article 2.

Thereafter, the gripping group 4 can be approached to a storage station 7 to deposit thereon the newly picked slab-shaped article 2 or to pick up a slab-shaped article 2 and place it on top of the supporting frame 8 so as to make up a final frame 30, which is then transferred to the unloading station 9.

In particular, the slab-shaped articles 2 arriving on the supplying plane 3 must be moved or stored according to their type and then picked up for marketing or further machining, if necessary.

Conveniently, the movement means 5 comprise at least one pair of sliding guides 11 extending along the direction of movement A and at least one load-bearing frame 12 associated in a movable and sliding manner with the pair of sliding guides 11 and supporting the gripping group 4.

Preferably, the direction of movement A is substantially horizontal.

The aforementioned supplying plane 3 is arranged along the direction of movement A.

The movement means 5 allow, therefore, the movement of the gripping group 4 and of the supporting frame 8 in the work area 6, along the direction of movement A, for the transfer of the slab-shaped articles 2 to and from the storage stations 7.

In more detail, the storage stations 7 are positioned at the work area 6.

This way, the gripping group 4 can easily reach the storage stations 7, which are allocated in space so as not to hinder the displacements of the gripping group itself along the direction of movement A.

Conveniently, the gripping group 4 is movable with respect to the load-bearing frame 12 along a direction of translation T transverse to the direction of movement A when approaching/moving away from the storage stations 7.

The direction of translation T is substantially perpendicular to the direction of movement A.

In more detail, the equipment 1 comprises translation means placed between the gripping group 4 and the load-bearing frame 12 and adapted to move the gripping group itself along the direction of translation T.

Advantageously, each storage station 7 comprises at least one storage frame 13 for the logistics of the slab-shaped articles 2.

Figure 8:
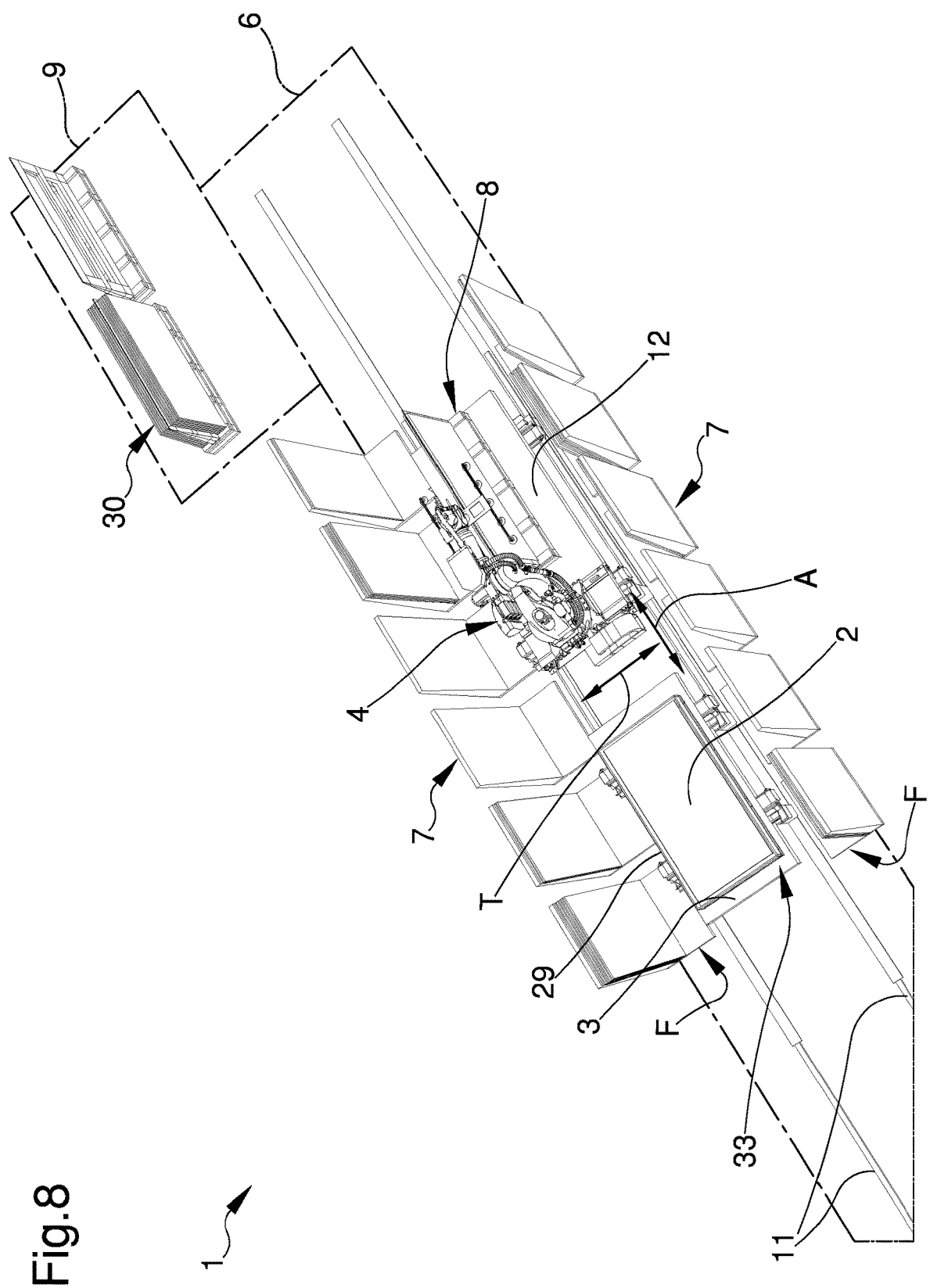
FIG. 8 is a perspective view of a fourth embodiment of the equipment according to the invention.
Figure 9:
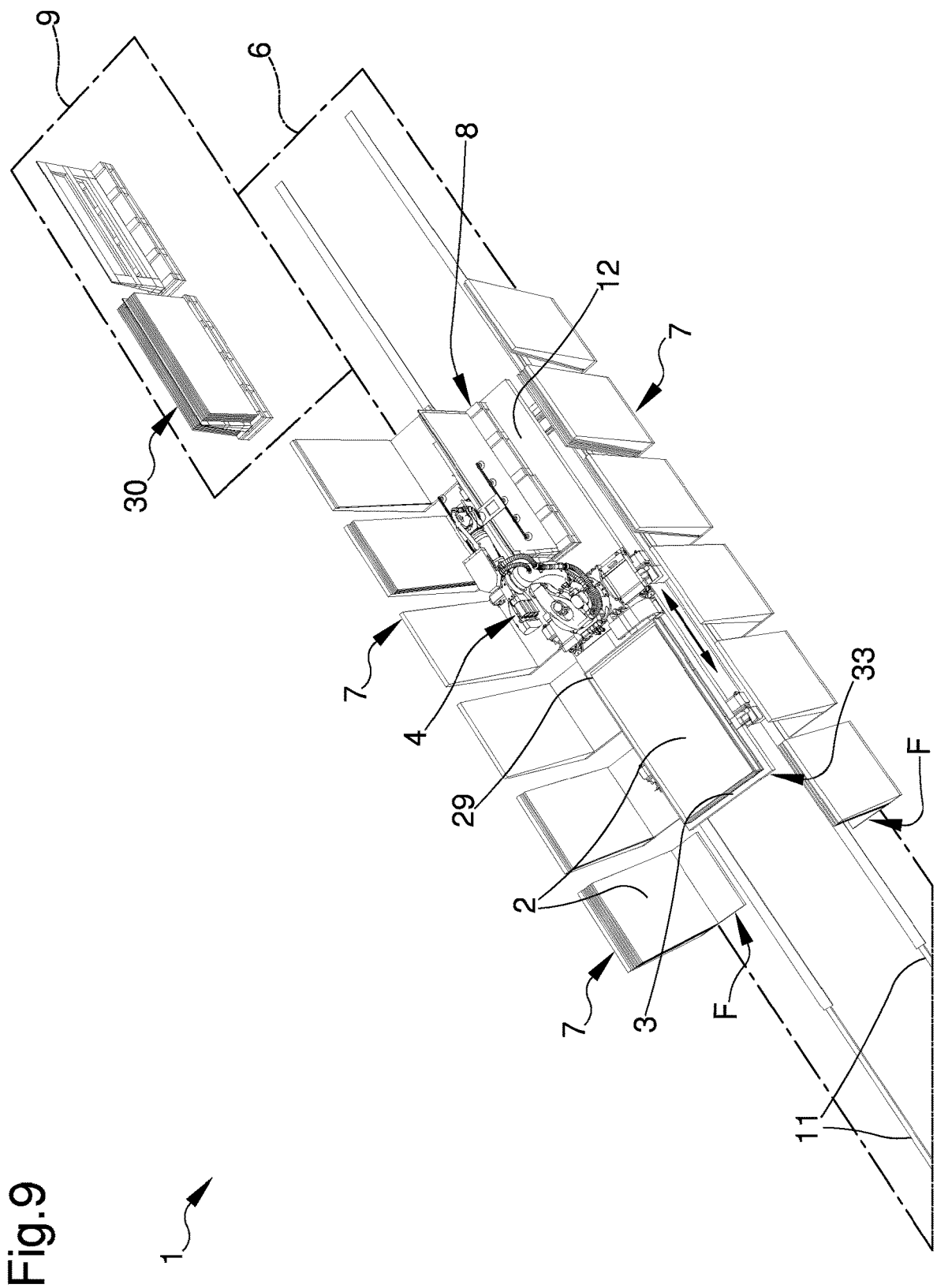
FIG. 9 is a perspective view of a fifth embodiment of the equipment according to the invention.
Figure 10:
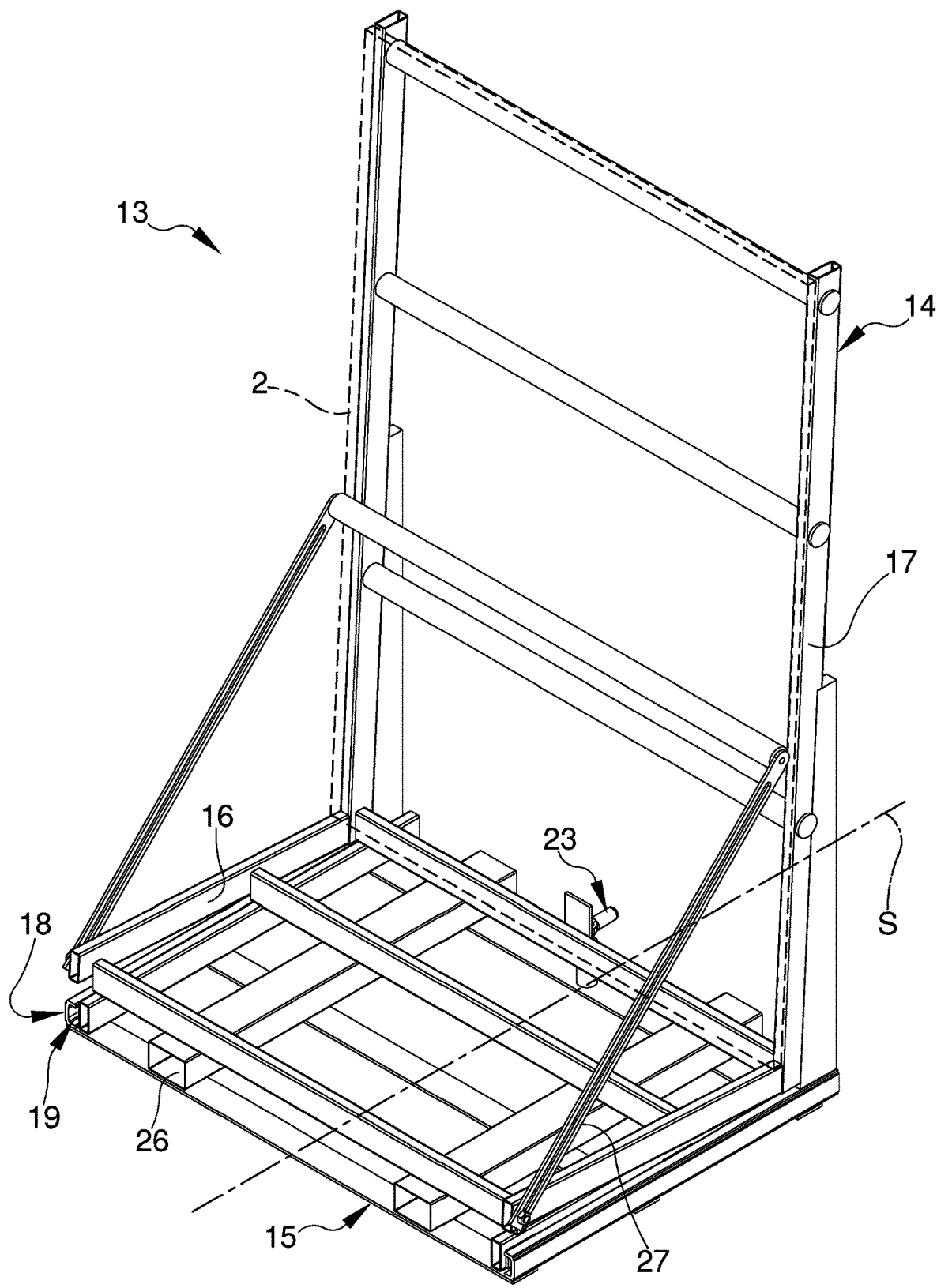
FIG. 10 is an axonometric view of a storage station according to the invention.
Figure 12:
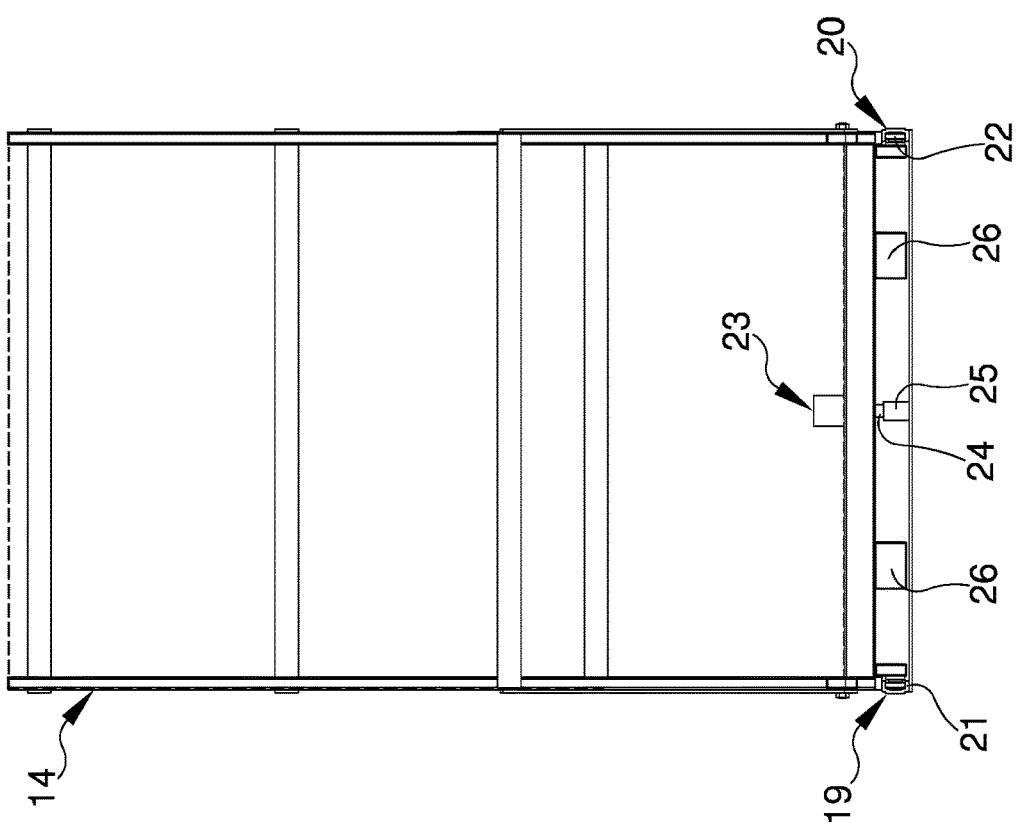
FIG. 12 is a rear elevation view of the storage station in FIG. 10.
Figure 11:
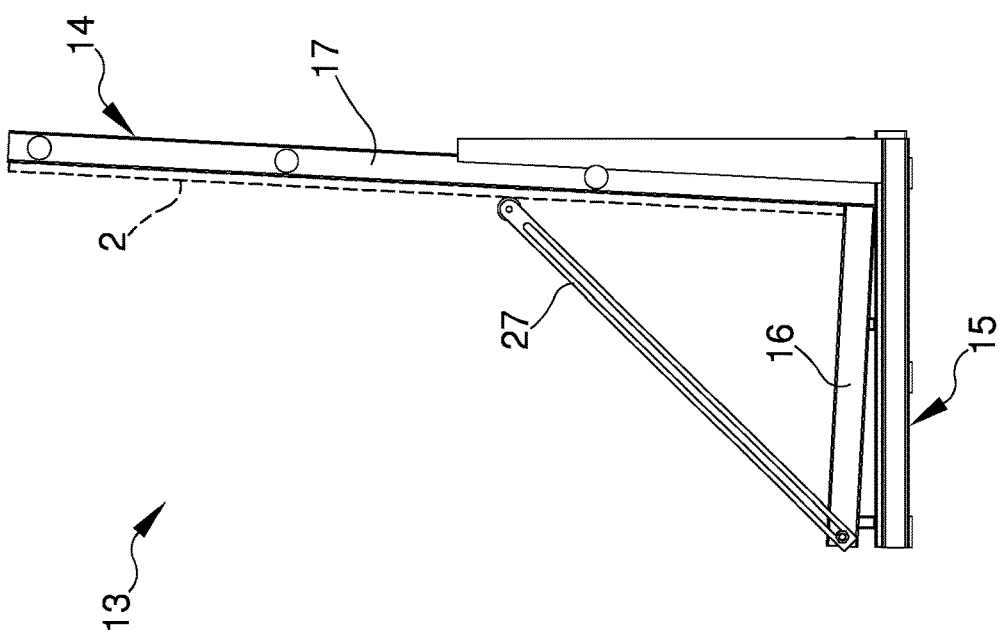
FIG. 11 is a side elevation view of the storage station in FIG. 10.

The storage frame 13 is schematically shown in FIGS. 1 to 9, while it is shown in greater detail in FIGS. 10 to 12.

The storage frame 13 is provided with:
- at least one holding frame 14 of one or more slab-shaped articles 2;
- at least one fixed frame 15, anchored to the ground.

The holding frame 14 is provided with:
- at least one basic element 16 adapted to receive and support the thickness of the slab-shaped article 2; and
- at least one stop element 17 extending transversely to the basic element 16 and adapted to receive and support at least one face of the slab-shaped article 2.

Preferably, the basic element 16 defines a substantially flat basic surface positioned slightly inclined with respect to a horizontal plane, and the stop element 17 defines a substantially flat stop surface positioned slightly inclined with respect to a vertical plane.

Appropriately, the basic element 16 and the stop element 17 are arranged so that the basic surface and the stop surface define a substantially right angle with each other.

This arrangement of the basic element 16 and of the stop element 17 results in the slab-shaped article 2, when allocated resting on the holding frame 14, being positioned slightly inclined with respect to a vertical axis, so as to limit the risk of tipping over and sliding downwards.

Conveniently, the storage frame 13 comprises removable engagement means 18 for engaging the holding frame 14 to the fixed frame 15.

The engagement means 18 are adapted to allow the holding frame 14 to slide with respect to the fixed frame 15 along a substantially horizontal direction of sliding S, and to prevent the holding frame 14 from lifting with respect to the fixed frame 15.

Precisely, the holding frame 14 may be alternatively allocated in a first configuration wherein it is associated in a sliding manner with the fixed frame 15 and in a second configuration wherein it is instead disengaged from the fixed frame 15.

Conveniently, during the positioning of the slab-shaped article 2 on the holding frame 14 by the gripping group 4, the holding frame 14 is engaged with the fixed frame 15.

The holding frame 14, on the other hand, is disengaged from the fixed frame 15 when, e.g., it has to be moved away from the work area 6.

Preferably, the engagement means 18 comprise:
- guidance means 19 associated with one of either the fixed frame 15 or the holding frame 14; and
- sliding means 20 associated with the other of either the fixed frame 15 or the holding frame 14, where the sliding means 20 are engageable in a removable manner with the guidance means 19.

In the particular embodiments shown in the figures, the guidance means 19 are associated with the fixed frame 15 and the sliding means 20 are associated with the holding frame 14.

Precisely, the guidance means 19 comprise at least one pair of substantially C-shaped guidance elements 21, so as to define a relevant housing seat extending along the direction of sliding S and arranged side by side.

The sliding means 20 comprise at least one pair of rolling elements 22, e.g. wheels, each of which is insertable in a relevant housing seat.

Precisely, the rolling elements 22 slide in the housing seat along the direction of sliding S as a result of the engagement of the holding frame 14 with the fixed frame 15.

At the same time, the upper portion of the housing seat prevents the rolling elements 22 from exiting the guidance elements 21 by moving upwards.

This way, the holding frame 14 can slide with respect to the fixed frame 15 without being lifted upwards.

The rolling elements 22 slide inside their respective housing seats until they contact an end-of-stroke element, arranged at an end portion of each guidance element 21.

Conveniently, the storage frame 13 comprises locking means 23 of the holding frame 14 with respect to the fixed frame 15 along the direction of sliding S.

In more detail, the locking means 23 comprise a locking element 24 associated with the holding frame 14 and insertable in a stop seat 25 associated with the fixed frame 15.

Suitably, the locking element 24 and the stop seat 25 are aligned to each other when the holding frame 14 reaches the end-of-stroke position defined by the end-of-stroke element.

The locking element 24 is movable between a blocking position, wherein it is engaged in the stop seat 25, and a release position, wherein it is disengaged from the stop seat 25.

The storage frame 13 comprises gripping means 26 formed on the holding frame 14 and engageable to allow lifting and moving the holding frame 14 when disengaged from the fixed frame 15.

Conveniently, the storage frame 13 comprises restraining means 27 of the slab-shaped article 2 deposited on the holding frame 14.

The restraining means 27 are associated with the holding frame 14 and are movable between:
- at least one restraining configuration wherein they face the stop element 17;
- at least one release configuration wherein they are spaced apart from the stop element 17 with respect to the restraining configuration, so as to allow the positioning/picking of the slab-shaped article 2.

The movement of the restraining means 27 can be done manually by an operator or can be done automatically.

Precisely, when the gripping group 4 deposits or picks the slab-shaped article 2 on or from the storage frame 13, the restraining means 27 are positioned in the release configuration so as not to hinder the movement operations of the slab-shaped article 2.

Likewise, as a result of the positioning of the slab-shaped article 2 on the storage frame 13, the restraining means 27 are placed in the restraining configuration and are arranged in the proximity of or in support on the slab-shaped article 2.

This way, the restraining means 27 are able to prevent the slab-shaped article 2 from falling accidentally from the storage frame 13.

Advantageously, the equipment 1 comprises at least one row F of storage stations 7 positioned substantially aligned to each other along the direction of movement A at the point where a lateral edge of the work area 6 is located.

In particular, the row F is arranged laterally to one of the sliding guides 11, which is arranged inside the work area 6.

In the embodiments shown in the figures, the equipment 1 comprises at least two rows F arranged on opposite sides to the gripping group 4.

In particular, the rows F are arranged substantially parallel to each other and facing each other.

More particularly, the work area 6 is placed between the rows F.

As shown in the figures, each of the sliding guides 11 is arranged inside the work area 6.

This embodiment ensures that the gripping group 4 can easily reach the storage stations 7 allocated on opposite sides to the work area 6.

Precisely, the gripping group 4, after being positioned in the proximity of a storage station 7 arranged on one row F, can easily reach the storage station 7 placed in front without being further moved horizontally, along the direction of movement A or transversely with respect thereto.

This can improve the production output of the equipment 1 and save time and energy.

Advantageously, the gripping group 4 is of the type of an anthropomorphic robot.

The gripping group 4 is, therefore, provided with multiple degrees of freedom and is able to move the slab-shaped article 2 in a practical and easy way.

Advantageously, the gripping group 4 comprises grasping means 10 of the slab-shaped article 2.

In the particular embodiments shown in the figures, the grasping means 10 are of the type of suction cups.

More particularly, the grasping means 10 comprise a plurality of suction cups 10*a* and at least one vacuum circuit operationally connected to the suction cups themselves.

Alternative embodiments cannot however be ruled out wherein the grasping means 10 have different conformation and, for example, may be of the type of hooking elements or grippers.

Specifically, the grasping means 10 comprise a holding structure 31,32 supporting the suction cups 10*a*.

The grasping means 10 comprise safety means, not shown in detail in the figures, adapted to prevent the slab-shaped article 2 from falling.

The safety means comprise detection means for detecting the absence of vacuum in at least one of the suction cups 10*a*.

In fact, if one of the suction cups 10a does not perfectly adhere to the slab-shaped article 2, the slab-shaped article 2 could partially or totally detach from the gripping group 4 and be damaged.

Thanks to the presence of the detection means for detecting the absence of vacuum, the equipment 1 can be blocked, thus avoiding the movement of an unsafely grasped slab-shaped article 2.

Alternatively, or in addition, the safety means may be of the mechanical type and comprise, e.g., a locking element (not shown in the figures) adapted to contact the slab-shaped article 2, so as to hold it, after it has been grasped.

This way, in the event of partial or complete loss of adhesion between the grasping means 10 and the slab-shaped article 2, the locking element holds the slab-shaped article 2 and prevents it from becoming unbalanced or falling during movement.

After the slab-shaped article 2 has been picked up from the storage station 7, it is placed on the supporting frame 8 to make up the final frame 30.

In particular, the supporting frame 8 is capable of supporting a plurality of slab-shaped articles 2, which can be easily packed thereon to form the final frame 30; after it has reached the unloading station 9, the final frame 30 can be directly intended for marketing.

Advantageously, the supporting frame 8 is arranged inside the work area 6.

In particular, the gripping group 4 and the supporting frame 8 are both mounted on the load-bearing frame 12.

This way, the gripping group 4 is able to easily position the slab-shaped articles 2 on the supporting frame 8 after they have been picked up from the respective storage stations 7, without being further moved.

The supporting frame 8 is mounted in a removable manner on the load-bearing frame 12 and is adapted to be removed from the load-bearing frame itself in order to position the final frame 30 at the point where the unloading station 9 is located.

For this purpose, the load-bearing frame 12 is provided with anchoring means of the removable type of the supporting frame 8, not shown in detail in the figures.

The anchoring means are adapted to keep the supporting frame 8 anchored to the load-bearing frame 12 during movement of the supporting frame itself along the direction of movement A and to allow the removal thereof after the unloading station 9 has been reached.

In fact, if necessary, the gripping group 4 positions the slab-shaped articles 2 on the supporting frame 8 and, at the end of this operation, the movement means transfer the final frame 30 to the unloading station 9. Here, by means of special lifting machines, such as, e.g., forklift trucks or transpallets or mechanical robots, the final frame 30 is positioned in the unloading station 9.

In particular, the unloading station 9 is represented by an area of the relevant plant on which the final frames 30 may be positioned resting on the ground or on appropriate structures.

The supporting frame 8 comprises:
at least one basic support 8a which can be positioned on the load-bearing frame 12 and adapted to receive and support the thickness of the slab-shaped article 2; and
at least one holding element 8b extending transversely to the basic support 8a and adapted to receive and support at least one face of the slab-shaped article 2.

In particular, the basic support 8a is positionable substantially horizontal on the load-bearing frame 12 and the holding element 8b extends vertically with respect to the basic support itself, along a median plane of the basic support 8a.

In other words, the supporting frame 8 is substantially shaped as an inverted "T".

Thus, the supporting frame 8 comprises two support areas for supporting the slab-shaped articles 2, arranged on opposite sides to the holding element 8b.

During the positioning operations, each support area faces a respective row F.

Conveniently, the supporting frame 8 comprises at least one blocking device of the slab-shaped article 2, not shown in detail in the figures, and adapted to keep the slab-shaped article itself anchored to the holding element 8b.

In particular, the blocking device is positionable so as to allow the positioning of the slab-shaped article 2 on the supporting frame 8.

The blocking device has, therefore, the function of preventing the slab-shaped article 2 from falling accidentally from the supporting frame 8 during the travel along the direction of movement A.

As shown in the figures, the supporting frame 8 extends along a longitudinal direction and is arranged on the load-bearing frame 12 parallel to the direction of movement A.

This way, the face of the slab-shaped article 2 lies on a plane substantially parallel to the direction of movement A.

This arrangement makes it possible to optimize the space and reduce the size of the supporting frame 8 with respect to the work area 6; in addition, this solution provides greater stability to the slab-shaped article 2 thus reducing the risk of accidental falling of the same.

According to a possible embodiment, shown in detail in FIGS. 13 and 14, the holding structure 31,32 of the gripping group 4 is movable between a home position and a blocking position, wherein it faces the holding element 8b to hold the slab-shaped article 2 arranged in support to the holding element itself.

This way, another function of the grasping means 10 is to block the slab-shaped article 2 on the supporting frame 8 during the movement of the same along the direction of movement A.

In more detail, the holding structure 31,32 comprises a first structure 31 that is fixed and at least a second structure 32 supporting the suction cups 10a and movable with respect to the first structure 31 between the home position and the blocking position.

Specifically, the second structure 32 is hinged to the first structure 31.

Conveniently, the holding structure 31,32 comprises two second structures 32 arranged on opposite sides to the first structure 31.

In the blocking position, the second structures 32 are arranged facing the holding element 8b, on opposite sides to the latter.

More specifically, in the blocking position each second structure 32 faces a respective support area of the supporting frame 8.

In the home position, the second structure 32 is substantially aligned to the first structure 31. In such a position, the first structure 31 and the second structures 32 are arranged on the same plane and may be moved to the point where a storage station 7 is located to pick up a slab-shaped article 2.

In the work position, the holding structure 31,32 is arranged at the holding element 8b and is arranged transversely with respect thereto. In this position, the second structure 32 is rotated with respect to the first structure 31.

The following is a detailed description of the different embodiments shown in the figures, which are distinguished by the type of supplying plane 3.

The common elements to all described and shown embodiments are identified below with the same reference numbers.

In the first embodiment, shown in FIGS. 1 to 4, the supplying plane 3 is fixed and is arranged at one end of the work area 6, opposite the unloading station 9. FIGS. 5 to 9, on the other hand, show further embodiments of the present equipment wherein the supplying plane 3 is movable in translation along the direction of movement A.

Figure 5:
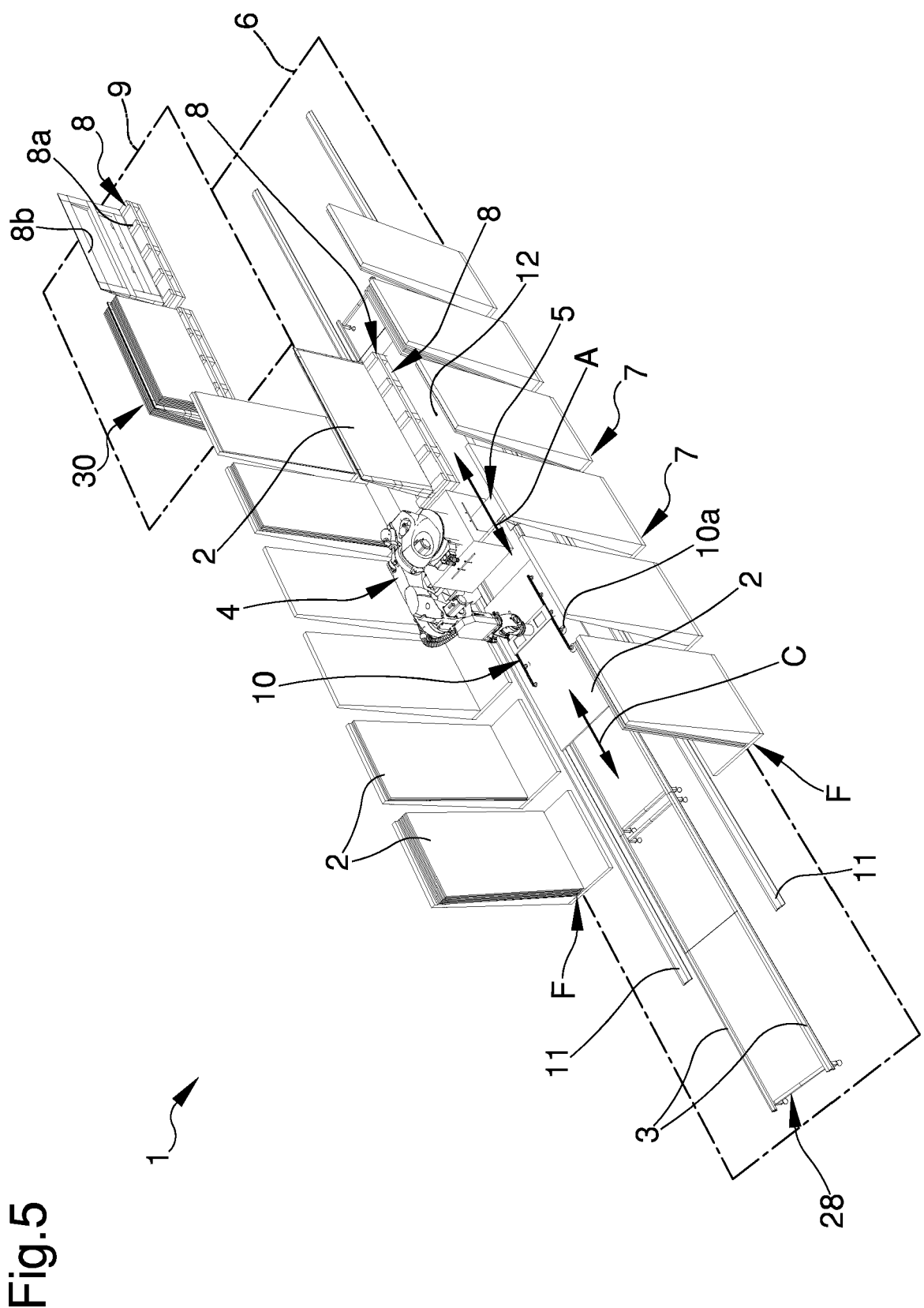
FIGS. 5 and 6 are perspective views of a second embodiment of the equipment according to the invention.
Figure 6:
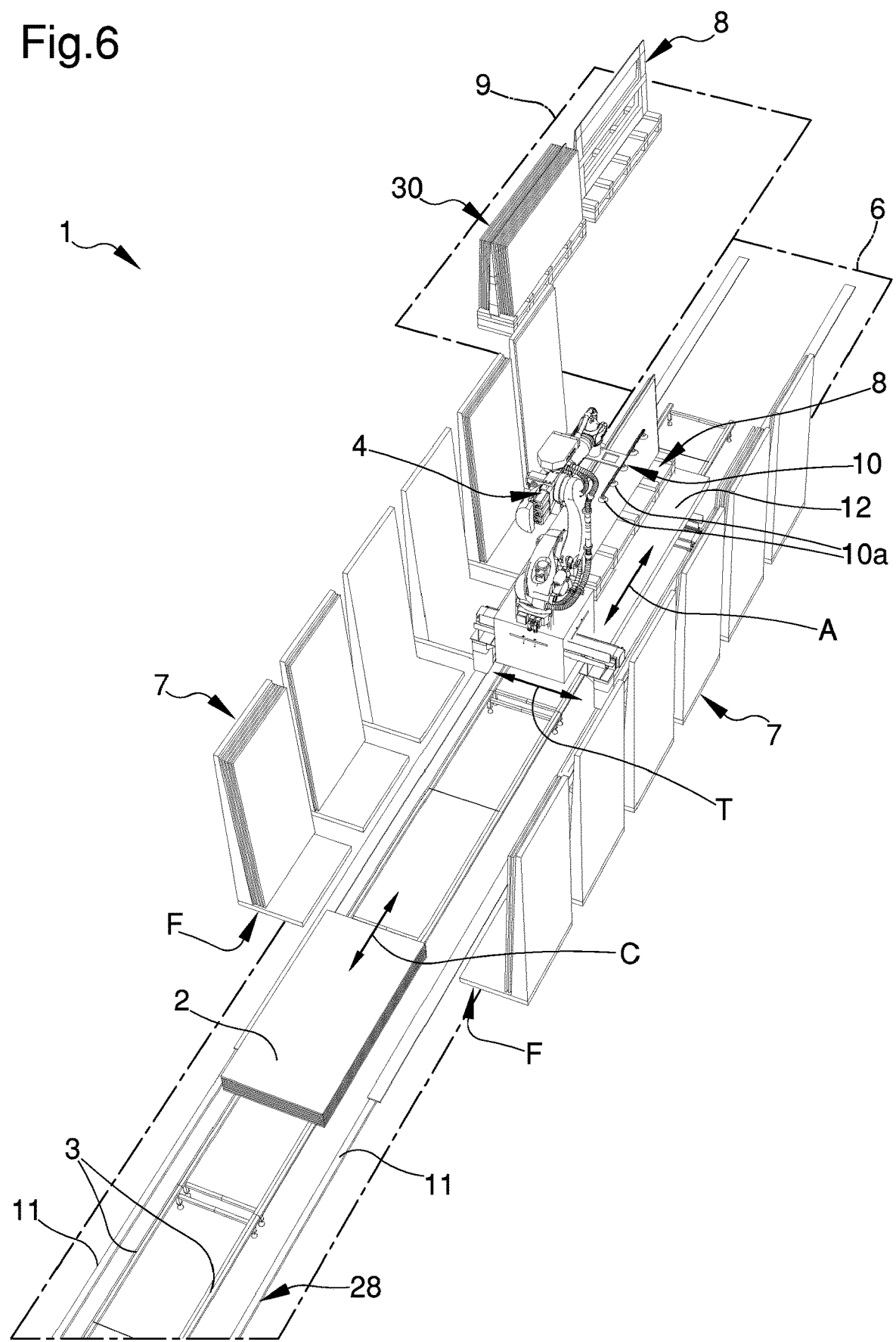
Figure 7:
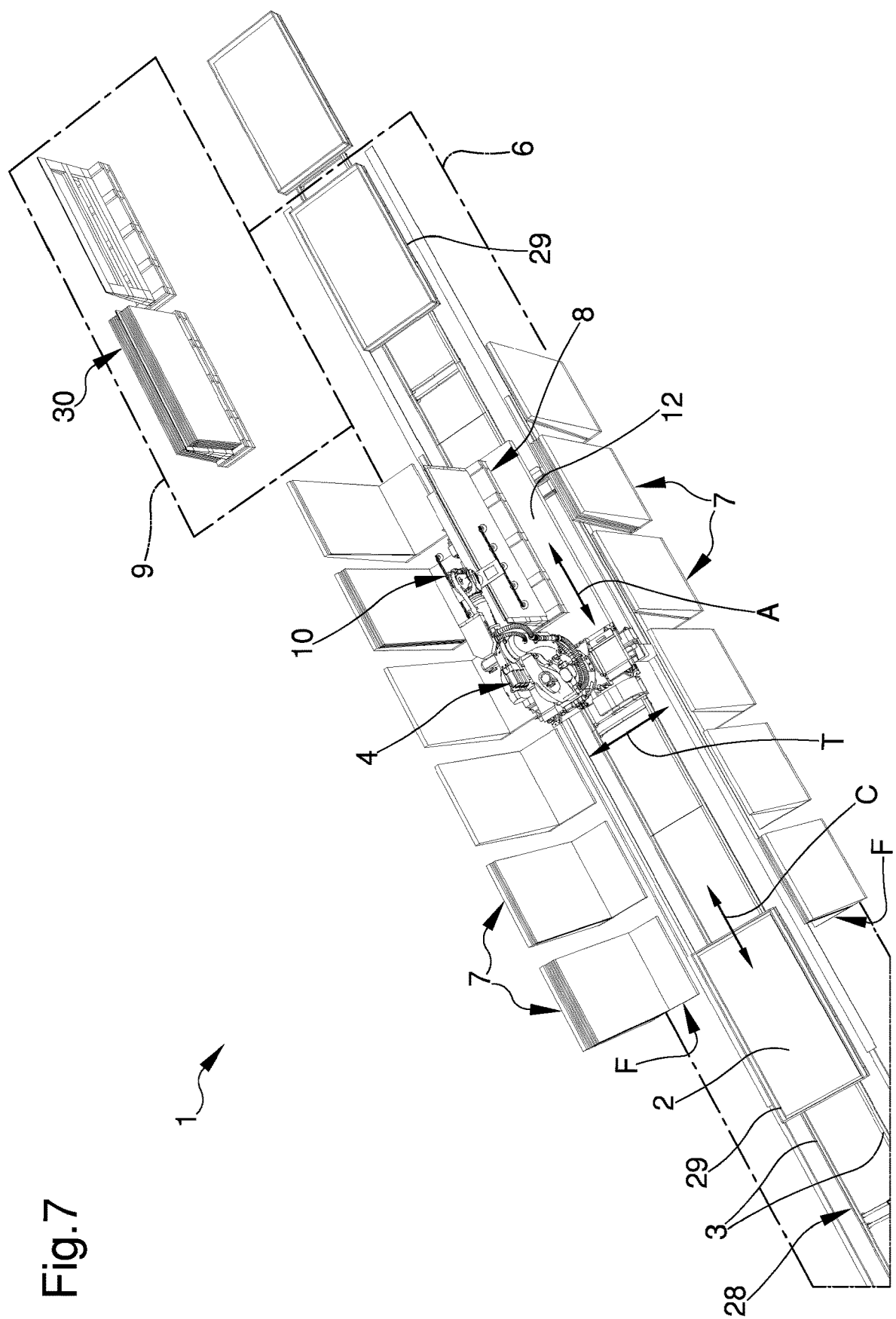
FIG. 7 is a perspective view of a third embodiment of the equipment according to the invention.

According to the embodiments shown in FIGS. 5 to 7, the equipment 1 comprises at least one conveyor line 28 of the slab-shaped article 2 arranged inside the work area 6.

In particular, the conveyor line 28 extends by at least the entire length of the sliding guides 11, until it reaches at least the unloading station 9.

Advantageously, the conveyor line 28 is placed between the rows F.

The conveyor line 28 defines the supplying plane 3 and is movable along at least one direction of conveyance C substantially parallel to the direction of movement A.

In the particular embodiment shown in the figures, the conveyor line 28 is, e.g., of the type of a belt conveyor line or the like.

The slab-shaped article 2 is then placed in support on the conveyor line 28 and is moved towards the gripping group 4.

The slab-shaped articles 2 may be arranged continuously along the conveyor line 28, in succession to each other.

Alternatively or in combination, as shown in FIG. 6, the slab-shaped articles 2 may be arranged on the conveyor line 28 stacked on top of each other.

Again, with reference to FIG. 7, the conveyor line 28 may receive and support the container body 29 containing the slab-shaped articles 2, which is moved towards the gripping group 4.

The gripping group 4 is adapted to pick up the slab-shaped article 2 from the conveyor line 28 and place it on one of the storage stations 7.

The conveyor line 28 makes it possible to speed up the supplying operations of the slab-shaped articles 2, which are, in fact, transferred onto it and promptly picked up by means of the gripping group 4.

In fact, this solution makes it possible to reduce the number of travels made by the gripping group 4 to pick up the slab-shaped articles 2 to be stored.

The conveyor line 28 moves the slab-shaped article 2 until it reaches the relevant storage station 7, where it is picked up by the gripping group 4.

Conveniently, the conveyor line 28 is positioned at a lower height than the load-bearing frame 12 so as to pass thereunder.

In other words, the load-bearing frame 12 is movable along the sliding guides 11 above the conveyor line 28.

With reference to the embodiment shown in FIG. 7, at the end of the positioning operations, the empty container body 29 is moved again along the direction of movement A, away from the gripping group 4, by passing thereunder.

Conveniently, the conveyor line 28 is arranged at a distance of between 10 cm and 110 cm from the load-bearing frame 12.

Appropriately, the conveyor line 28 is arranged at a distance from the load-bearing frame 12 such that the container body 29 is allowed to pass thereunder.

According to the embodiments shown in FIGS. 8 and 9, the equipment 1 comprises at least one movable device 33, defining the supplying plane 3.

The movable device 33 is associated in a sliding manner with the sliding guides 11.

The movable device 33 is of the type of a trolley movable along the direction of movement A in either direction.

The movable device 33 is, therefore, movable between one end of the work area 6, wherein it receives the slab-shaped articles 2, up to a storage station 7 on which the slab-shaped articles 2 are to be placed.

Similarly to what described above, the movable device 33 may receive and support the container body 29 provided with the slab-shaped articles 2 to be positioned.

According to the embodiment shown in FIG. 8, the movable device 33 is movable independently with respect to the gripping group 4 along the direction of movement A.

This solution allows loading the slab-shaped articles 2 on the movable device 33 while allowing the gripping group 4 to carry out its own operations without interruption.

FIG. 9 shows a further embodiment wherein, on the contrary, the movable device 33 is movable locked together with the gripping group 4.

Specifically, the movable device 33 is locked together with the load-bearing frame 12.

Conveniently, the movable device 33 is arranged opposite the supporting frame 8 with respect to the gripping group 4.

Therefore, the movable device 33 and the gripping group 4 move simultaneously in the work area 6 along the direction of movement A.

This embodiment allows easily positioning the slab-shaped articles 2 arranged on the movable device 33 even on different storage stations 7.

The operation of the equipment 1 in performing the process according to the invention is as follows.

The process first involves a phase of supply of a piece of equipment 1 according to the embodiments described above.

Next, the process comprises the phases of:
supplying a plurality of slab-shaped articles 2;
collecting one of the slab-shaped articles 2 from the supplying plane 3;
placing the slab-shaped article 2 on one of the storage stations 7; and
picking one of the slab-shaped articles 2 from one of the storage stations 7 to place it on the supporting frame 8.

The aforementioned collecting, placing and picking phases are repeated in order to make up a final frame 30.

Finally, the process comprises a phase of unloading the final frame 30 in the unloading station 9.

Initially, the process comprises a phase of blocking the holding frame 14 to the fixed frame 15 of the storage stations 7, in order to prepare them for the subsequent placing phases.

The holding frame 14 is approached to the fixed frame 15 and, thereafter, the locking element 24 is inserted inside the stop seat 25 thereby blocking the holding frame 14 to the fixed frame 15.

At this point, the storage frame 13 is ready for the placement of the slab-shaped articles 2.

The slab-shaped articles 2 are arranged on the supplying plane 3.

The process may conveniently comprise a phase of supplying at least one container body 29 to be emptied, containing a plurality of slab-shaped articles 2 to be positioned. The container body 29 to be emptied is arranged on the supplying plane 3.

The phase of collecting provides for the gripping group 4 picking up a slab-shaped article 2 from the supplying plane 3 using the grasping means 10.

Conveniently, according to the first embodiment, wherein the supplying plane 3 is fixed, the phase of collecting comprises a phase of translation of the gripping group 4 with respect to the supplying plane 3 along the direction of movement A.

Referring to the first embodiment shown in FIGS. 1 to 4, the gripping group 4 translates to the end of the work area 6 to pick up each slab-shaped article 2.

According to the embodiments shown in FIGS. 5 to 8, the phase of collecting comprises at least one phase of sliding of the supplying plane 3 with respect to the gripping group 4 along the direction of movement A.

It is easy to understand that such solutions may further provide for the translation of the gripping group 4 with respect to the supplying plane 3, if necessary, to facilitate and speed up the pick up of the slab-shaped article 2.

Conveniently, the phase of sliding may comprise approaching the container body 29 to be emptied to the gripping group 4.

The container body 29 is moved along the direction of movement A, on the conveyor line 28 or on the movable device 33.

In particular, with reference to the embodiment shown in FIGS. 5 to 7, the slab-shaped articles 2 positioned on the conveyor line 28 slide close to the gripping group 4 and are arranged at the respective storage stations 7.

In the fourth embodiment shown in FIG. 8, the movable device 33 translates from the end of the work area 6, where it receives the slab-shaped articles 2, up to the storage station 7.

According to the embodiment shown in FIG. 9, on the other hand, the gripping group 4 and the supplying plane 3 move locked together. Such a solution provides for the load-bearing frame 12 translating towards the end of the work area 6 where a plurality of slab-shaped articles 2 are placed on the movable device 33. At that point, the gripping group 4 and the supplying plane 3 translate towards the storage stations to perform the positioning operations.

In each of the described embodiments, the gripping group 4 places the slab-shaped articles 2 in the relevant storage stations 7.

In particular, thanks to the grasping means 10, the gripping group 4 collects a slab-shaped article 2 from the supplying plane 3 and deposits it on the holding frame 14 so that its thickness gets in contact with the basic element 16 and one of its faces stops on the stop element 17.

At the end of the phase of collecting, the process comprises a phase of moving an empty container body 29 away from the gripping group 4.

In the embodiment shown in FIGS. 1 to 7, the phase of moving away is performed in a direction concordant with the direction of movement A.

Specifically, the phase of moving away comprises a phase of transit of the empty container body 29 below the gripping group 4. As exposed above, in fact, the conveyor line 28 is arranged with respect to the load-bearing frame 12 at a distance such as to allow the passage of the container body 29 below the latter.

In the embodiment shown in FIGS. 8 and 9, on the other hand, the phase of moving away is carried out in the opposite direction to the direction of movement A.

In particular, the movable device 33 translates back to the end of the work area 6 to receive new slab-shaped articles 2.

At the same time, the gripping group 4 picks up the slab-shaped articles 2 required to make up the final frame 30, by means of the grasping means 10, and arranges them on the supporting frame 8.

For this purpose, the blocking device is appropriately positioned to allow the slab-shaped article 2 to be positioned on the supporting frame 8 and to anchor it to the supporting frame itself during the movement along the direction of movement A.

Alternatively or in combination, the second structures 32 are moved to the blocking position to keep the slab-shaped articles 2 in support to the holding element 8b.

Upon completion of these operations, the movement means 5 bring the final frame 30 to the unloading station 9, wherein it is removed from the load-bearing frame 12 to be moved to further machining stations.

It has in practice been ascertained that the described invention achieves the intended objects and, in particular, the fact is emphasized that the equipment allows moving the slab-shaped articles in an easy and safe way, thus limiting the risk of breakage or damage.

Moreover, the presence of the supporting frame, mounted on the load-bearing frame of the gripping group and the possibility of packing the slab-shaped articles thereon, allow an optimization of the machining timelines and an increase in the production output of the logistic plant.

The invention claimed is:

1. Equipment for the logistics of slab-shaped articles, the equipment comprising:
    at least one supplying plane of at least one slab-shaped article;
    at least one robotic gripping group of said slab-shaped article provided with at least three degrees of freedom and positioned in the proximity of said supplying plane;
    movement means of said gripping group along at least one direction of movement so as to define at least one work area of said gripping group, where the movement means comprise at least one pair of sliding guides extending along the direction of movement and at least one load-bearing frame associated in a movable and sliding manner with the pair of sliding guides and supporting the gripping group and where the gripping group and the supporting frame are both mounted on the load-bearing frame;
    a plurality of temporary storage stations of said slab-shaped article positioned substantially parallel to said direction of movement;
    at least one supporting frame of said slab-shaped article supported as an integral part to said movement means along said direction of movement; and
    at least one unloading station of said supporting frame;
    wherein said gripping group is adapted to:
    take said slab-shaped article from said supplying plane;
    place said slab-shaped article on at least one of said storage stations;
    take said slab-shaped article from at least one of said storage stations to place it on said supporting frame, when the supporting frame is mounted on the load-bearing frame, so as to make up a final frame, the final frame comprising the supporting frame and the slab-shaped articles taken from the storage stations by the gripping group; and
    unloading said final frame from said load-bearing frame in said unloading station, wherein
    the supporting frame being mounted in a removable manner on the load-bearing frame and being adapted to be removed from the load-bearing frame in order to position the final frame at the point where the unloading station is located.

2. The equipment according to claim 1, wherein said gripping group comprises grasping means of said slab-shaped article.

3. The equipment according to claim 2, wherein said grasping means comprise a holding structure supporting suction cups, movable between a home position and a blocking position, wherein said grasping means faces a holding element to hold said slab-shaped article arranged in support to the holding element itself.

4. The equipment according to claim 3, wherein said holding structure comprises a first structure that is fixed and at least a second structure supporting said suction cups, wherein said second structure is movable with respect to said first structure between said home position and said blocking position.

5. The equipment according to claim 4, wherein said second structure is hinged to said first structure.

6. The equipment according to claim 4, wherein, in said home position, said second structure is substantially aligned to said first structure and, in said blocking position, said second structure is rotated with respect to said first structure.

7. The equipment according to claim 1, wherein said supplying plane is movable in translation along said direction of movement.

8. The equipment according to claim 7, further comprising: at least one conveyor line of said slab-shaped article arranged inside said work area, defining said supplying plane and movable along at least one direction of conveyance substantially parallel to said direction of movement, wherein said conveyor line is positioned at a lower height than said load-bearing frame so as to pass thereunder, said gripping group being adapted to pick said slab-shaped article from said conveyor line to position said slab-shaped article on one of said storage stations.

9. The equipment according to claim 7, further comprising: at least one movable device, defining said supplying plane and associated in a sliding manner with said sliding guides.

10. The equipment according to claim 9, wherein said movable device is movable locked together with said gripping group along said direction of movement.

11. The equipment according to claim 1, wherein each of said storage stations comprises at least one storage frame comprising:
at least one holding frame of said slab-shaped article and comprising:
at least one basic element adapted to receive and support the thickness of said slab-shaped article; and
at least one stop element extending transversely to said basic element and adapted to receive and support at least one face of said slab-shaped article;
at least one fixed frame, anchored to the ground;
removable engagement means for engaging said holding frame to said fixed frame, wherein said engagement means are adapted to allow said holding frame to slide with respect to said fixed frame along a substantially horizontal direction of sliding and to prevent said holding frame from lifting with respect to said fixed frame.

12. A process for the logistics of slab-shaped articles, the process comprises the phases of:
supplying a piece of said equipment according to claim 1;
supplying a plurality of slab-shaped articles;
collecting one of said slab-shaped articles from said supplying plane;
placing said slab-shaped articles on one of said storage stations; and
picking one of said slab-shaped articles from one of said storage stations to place said one of said slab-shaped articles on said supporting frame;
repeating the phases of collecting, placing and picking to make up a final frame; and
unloading said final frame in said unloading station.

13. The process according to claim 12, wherein said phase of collecting comprises a phase of translation of said gripping group with respect to said supplying plane along said direction of movement.

14. The process according to claim 12, wherein said phase of collecting comprises at least one phase of sliding of said supplying plane with respect to said gripping group along said direction of movement.

15. The process according to claim 12, further comprising: a phase of supplying at least one container body to be emptied, containing a plurality of slab-shaped articles to be positioned.

16. The process according to claim 15, wherein said phase of sliding comprises a phase of movement of said container body to be emptied, approaching said gripping group.

17. The process according to claim 16, wherein said phase of movement is carried out along said direction of movement.

18. The process according to claim 15, further comprising: a phase of moving an empty container body away from said gripping group.

19. The process according to claim 18, wherein said phase of moving away is performed in a direction concordant with said direction of movement.

20. The process according to claim 18, wherein said phase of moving away is carried out in the opposite direction to said direction of movement.

21. The process according to claim 18, wherein said phase of moving away comprises a phase of transit of said empty container body below said gripping group.

22. The equipment according to claim 1, wherein the load-bearing frame is provided with anchoring means of the removable type of the supporting frame, said anchoring means being adapted to keep the supporting frame anchored to the load-bearing frame during movement of the supporting frame itself along the direction of movement and to allow the removal thereof after the unloading station has been reached.

23. The equipment according to claim 1, wherein the supporting frame comprises:
at least one basic support which can be positioned on the load-bearing frame and adapted to receive and support the thickness of the slab-shaped article; and
at least one holding element extending transversely to the basic support and adapted to receive and support at least one face of the slab-shaped article.

24. The equipment according to claim 23, wherein the basic support is positioned substantially horizontal on the load-bearing frame and the holding element extends vertically with respect to the basic support itself, along a median plane of the basic support.

25. The equipment according to claim 23, wherein the supporting frame comprises two support areas for supporting the slab-shaped articles, arranged on opposite sides to the holding element.

26. The equipment according to claim 23, wherein the supporting frame extends along a longitudinal direction and is arranged on the load-bearing frame parallel to the direction of movement.

27. The equipment according to claim 23, wherein the supporting frame comprises at least one blocking device of the slab-shaped article and adapted to keep the slab-shaped article itself anchored to the holding element.

\* \* \* \* \*